US009465903B1

(12) United States Patent
Timmireddy et al.

(10) Patent No.: US 9,465,903 B1
(45) Date of Patent: Oct. 11, 2016

(54) PROGRAMMABLE IC DESIGN CREATION USING CIRCUIT BOARD DATA

(71) Applicant: Xilinx, Inc., San Jose, CA (US)

(72) Inventors: Suman Kumar Timmireddy, Hyderabad (IN); Heera Nand, Alwar (IN); Awdhesh Kumar Sahu, Deonagar (IN); Brendan M. O'Higgins, Sunnyvale, CA (US); David A. Knol, Morgan Hill, CA (US); Siddharth Rele, Navi Mumbai (IN)

(73) Assignee: XILINX, INC., San Jose, CA (US)

( * ) Notice: Subject to any disclaimer, the term of this patent is extended or adjusted under 35 U.S.C. 154(b) by 31 days.

(21) Appl. No.: 14/546,684

(22) Filed: Nov. 18, 2014

(51) Int. Cl.
| | |
|---|---|
| G06F 17/50 | (2006.01) |
| G06F 19/00 | (2011.01) |
| H03K 19/177 | (2006.01) |
| G06F 21/12 | (2013.01) |
| G06F 15/78 | (2006.01) |

(52) U.S. Cl.
CPC ........... *G06F 17/5077* (2013.01); *G06F 17/50* (2013.01); *G06F 15/7867* (2013.01); *G06F 17/5022* (2013.01); *G06F 17/5054* (2013.01); *G06F 19/3406* (2013.01); *G06F 21/125* (2013.01); *H03K 19/17728* (2013.01); *H03K 19/17748* (2013.01)

(58) Field of Classification Search
CPC ........... G06F 17/5054; G06F 15/7867; G06F 19/3406; G06F 17/50; G06F 21/125; G06F 8/447; G06F 17/5022; H03K 19/17728; H03K 19/17748
USPC ...................................................... 716/137
See application file for complete search history.

(56) References Cited

U.S. PATENT DOCUMENTS

| | | | | | |
|---|---|---|---|---|---|
| 6,094,063 | A  * | 7/2000 | St. Pierre, Jr. | ... | H03K 19/01858 326/37 |
| 6,175,530 | B1 * | 1/2001 | Theron | ..... | G06F 1/30 365/201 |
| 6,308,311 | B1 * | 10/2001 | Carmichael | ......... | G06F 15/7867 716/117 |
| 6,351,809 | B1 * | 2/2002 | St. Pierre, Jr. | ...... | G06F 13/4068 710/10 |
| 6,487,618 | B1 * | 11/2002 | Theron | ............... | G06F 13/4286 710/105 |
| 6,499,134 | B1 * | 12/2002 | Buffet | ................ | G06F 17/5077 716/113 |
| 6,560,665 | B1 * | 5/2003 | Resler | ................ | G06F 15/7814 710/305 |
| 6,631,520 | B1 * | 10/2003 | Theron | ..................... | G06F 8/65 712/E9.007 |
| 6,903,574 | B2 * | 6/2005 | Chen | ..................... | G11C 5/066 326/40 |
| 7,243,314 | B2 * | 7/2007 | Ting | .................... | G06F 17/5077 716/111 |

(Continued)

*Primary Examiner* — Helen Rossoshek
(74) *Attorney, Agent, or Firm* — Robert M. Brush

(57) ABSTRACT

A method of implementing a circuit design in a circuit design tool for configuration in a programmable integrated circuit (IC) connected to components on a circuit board is described. The method includes processing a first file associated with the circuit board to obtain descriptions of circuit board interfaces of the components on the circuit board; displaying a graphic user interface (GUI) of the circuit design tool to connect a circuit board interface described in the first file with a circuit design interface in the circuit design; generating physical constraints on the circuit design interface with respect to input/outputs of the programmable IC described as being connected to the selected circuit board interface; and generating a bitstream to configure the programmable IC. The bitstream includes a physical implementation of the circuit design satisfying the physical constraints.

17 Claims, 8 Drawing Sheets

(56) References Cited

U.S. PATENT DOCUMENTS

| | | | |
|---|---|---|---|
| 7,290,237 B2 * | 10/2007 | Perry | G06F 17/5054 326/41 |
| 7,433,813 B1 * | 10/2008 | Ballagh | G06F 17/5022 326/39 |
| 7,640,527 B1 * | 12/2009 | Dorairaj | G06F 17/5072 716/139 |
| 8,001,509 B2 * | 8/2011 | Perry | G06F 17/5045 716/116 |
| 8,091,056 B1 * | 1/2012 | Campbell | G06F 17/5054 716/102 |
| 8,356,266 B1 * | 1/2013 | Ou | G06F 17/5072 716/104 |
| 8,739,088 B1 * | 5/2014 | Ou | G06F 17/5045 716/106 |
| 2002/0108094 A1 * | 8/2002 | Scurry | G06F 17/5022 716/102 |
| 2002/0199110 A1 * | 12/2002 | Kean | G06F 17/5054 713/189 |
| 2008/0270805 A1 * | 10/2008 | Kean | G06F 17/5054 713/189 |
| 2015/0324509 A1 * | 11/2015 | Xue | G06F 17/5072 716/116 |

* cited by examiner

```
Interface_name = dip_switches_4bits
    Type = interface:gpio_rtl:1.0
    Mode = Master
    PortMapping:
        TRI_I = dip_switches_4bits_tri_i
            Pin 0 (iostandard="LVCMOS25", loc="AK25")
            Pin 1 (iostandard="LVCMOS25", loc="K15")
            Pin 2 (iostandard="LVCMOS25", loc="R27")
            Pin 3 (iostandard="LVCMOS25", loc="T12")
```

401(1)

Module 504 — gpio 506 — 508 ext_dip_switches_4bits

502

```
set_property LOC AK25 [get_ports ext_dip_switches_4bits_port[0]]
set_property LOC K15 [get_ports ext_dip_switches_4bits_port[1]]
set_property LOC R27 [get_ports ext_dip_switches_4bits_port[2]]
set_property LOC T12 [get_ports ext_dip_switches_4bits_port[3]]
set_property IOSTANDARD LVCMOS25 [get_ports ext_dip_switches_4bits_port[0]]
set_property IOSTANDARD LVCMOS25 [get_ports ext_dip_switches_4bits_port[1]]
set_property IOSTANDARD LVCMOS25 [get_ports ext_dip_switches_4bits_port[2]]
set_property IOSTANDARD LVCMOS25 [get_ports ext_dip_switches_4bits_port[3]]
```

PROGRAMMABLE IC DESIGN CREATION USING CIRCUIT BOARD DATA

TECHNICAL FIELD

Examples of the present disclosure generally relate to electronic circuit design and, in particular, to programmable integrated circuit (IC) design creation using circuit board data.

BACKGROUND

Circuit designs for programmable integrated circuits (programmable ICs) can be generated using a variety of techniques. In some examples, designers can write register-transfer level (RTL) code, write program-language code, create schematic representations, or a combination thereof to design a circuit for implementation in a target programmable IC device. Circuit design implementation includes compiling or otherwise processing the design for configuration in a target programmable C. The target programmable IC device can be a field programmable gate array (FPGA), complex programmable logic device (CPLD), or the like. In the design flow, a designer creates a description of the circuit design, which is then processed through one or more steps that transform the description into a physical implementation of the circuit design for a target programmable IC device.

A programmable IC can be attached to a circuit board having a plurality of components. The programmable IC can connect to the components through conductive traces on the circuit board. The circuit board components can include, for example, memories, input/output devices, light-emitting diodes (LEDs), or the like. A circuit design can include interfaces to be coupled to compatible interfaces of components on the circuit board. The presence of these interfaces can make the circuit design process more complex.

SUMMARY

Techniques for programmable integrated circuit (IC) design creation using circuit board data are described. In an example, a method of implementing a circuit design in a circuit design tool for configuration in a programmable integrated circuit (IC) connected to components on a circuit board is described. The method includes processing a first file associated with the circuit board to obtain descriptions of circuit board interfaces of the components on the circuit board; displaying a graphic user interface (GUI) of the circuit design tool to connect a circuit board interface described in the first file with a circuit design interface in the circuit design; generating physical constraints on the circuit design interface with respect to input/outputs of the programmable IC described as being connected to the selected circuit board interface; and generating a bitstream to configure the programmable IC. The bitstream includes a physical implementation of the circuit design satisfying the physical constraints.

In another example, a non-transitory computer readable medium comprises instructions, which when executed in a computer system, cause the computer system to carry out a method of implementing a circuit design in a circuit design tool for configuration in a programmable integrated circuit (IC) connected to components on a circuit board. The method includes processing a first file associated with the circuit board to obtain descriptions of circuit board interfaces of the components on the circuit board; displaying a graphic user interface (GUI) of the circuit design tool to connect a circuit board interface described in the first file with a circuit design interface in the circuit design; generating physical constraints on the circuit design interface with respect to input/outputs of the programmable IC described as being connected to the selected circuit board interface; and generating a bitstream to configure the programmable IC. The bitstream includes a physical implementation of the circuit design satisfying the physical constraints.

In another example, a circuit design system includes a memory to store circuit design tool code and a central processing unit (CPU) that executes the circuit design tool code to: process a first file associated with a circuit board to obtain descriptions of circuit board interfaces of components on the circuit board; display a graphic user interface (GUI) to connect a circuit board interface described in the first file with a circuit design interface in a circuit design; generate physical constraints on the circuit design interface with respect to input/outputs of a programmable IC described as being connected to the selected circuit board interface; and generate a bitstream to configure the programmable IC. The bitstream includes a physical implementation of the circuit design satisfying the physical constraints.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 5 shows an example of constraint generation performed by a constraint generator.

To facilitate understanding, identical reference numerals have been used, where possible, to designate identical elements that are common to the figures. It is contemplated that elements of one example may be beneficially incorporated in other examples.

DETAILED DESCRIPTION

Techniques for programmable integrated circuit (IC) design creation using circuit board data are described. A circuit design tool can be used to specify a circuit design, compile the circuit design to produce a physical implementation for a target programmable IC, and generate a bitstream to configure the physical implementation in the programmable IC. In order to correctly generate the bitstream, the circuit design tool accounts for physical constraints on the circuit design, such as input/output (IO) package pin locations, IO signal standards, and the like. When the circuit design includes interfaces coupled to interfaces of components on a circuit board, the physical constraints depend on the connections between circuit board components and the programmable IC.

Accordingly, techniques described herein provide a data file ("circuit board file" or "board file") and data file format for describing circuit board components and interfaces. Techniques for making use of the circuit board files during circuit design implementation are also described. In general, a circuit board file include descriptions of the components and component interfaces, which enables the circuit design tool to generate physical constraints for connections between the circuit design and the circuit board components. The circuit board file can specify parameters associated with the circuit board components, which the circuit design tool can use to customize modules in the circuit design, such as parameterized intellectual property (IP) blocks. The circuit board file can specify groups of related circuit board interfaces, which the circuit design tool can use to ensure modules in the circuit design are correctly connected to the circuit board components. The circuit design tool can stitch circuit boards, such as a main circuit board and a daughter circuit board, by merging multiple circuit board files. The circuit design tool includes a graphical user interface (GUI) that can enumerate circuit board interfaces and circuit design interfaces, allowing selected connections therebetween. The circuit design tool can infer circuit design interfaces that can be connected to circuit board interfaces from module interfaces in the circuit design. These and further aspects of the present disclosure are discussed below.

Figure 1:
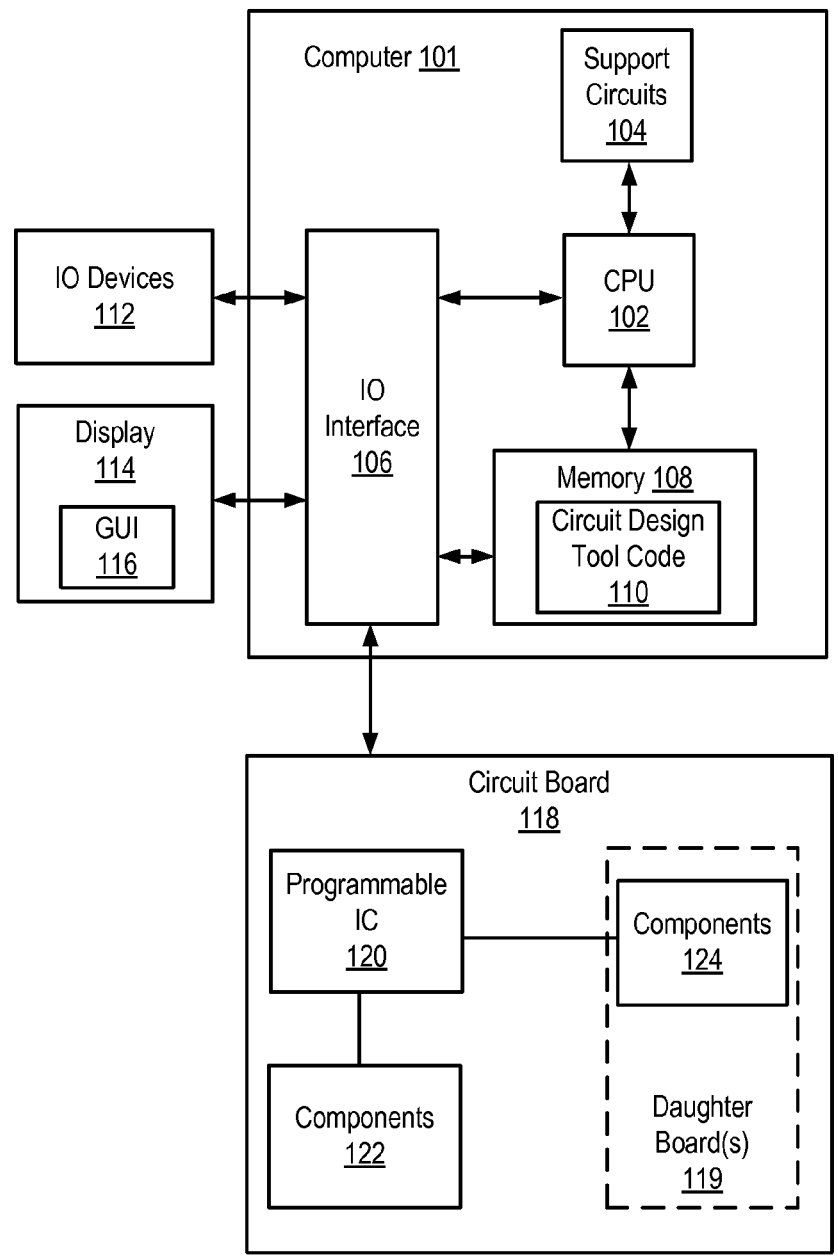
FIG. 1 is a block diagram depicting an example of a circuit design system.

FIG. 1 is a block diagram depicting an example of a circuit design system 100. The circuit design system 100 includes a computer 101 coupled to input/output (IO) devices 112, a display 114, and a circuit board 118 having a programmable IC 120. The computer 101 includes a central processing unit (CPU) 102, a memory 108, various support circuits 104, and an IO interface 106. The CPU 102 can include one or more microprocessors. The support circuits 104 can include conventional cache, power supplies, clock circuits, data registers, IO interfaces, and the like. The IO interface 106 can be directly coupled to the memory 108 or coupled through the CPU 102. The IO interface 106 can be coupled to the IO devices 112, which can include conventional keyboard, mouse, and the like. The IO interface 106 can also be coupled to the display 114, which can present a GUI 116 to a user.

The memory 108 may store all or portions of one or more programs and/or data to implement aspects of the circuit design system 100 described herein. For example, the memory 108 can store circuit design tool code 110 that is executable by the CPU 102 to implement a circuit design tool, which is described below. The memory 108 can include one or more of random access memory (RAM), read only memory (ROM), magnetic read/write memory, FLASH memory, solid state memory, or the like, as well as combinations thereof.

The circuit board 118 includes components 122 coupled to the programmable IC 120 through traces on the circuit board 118. The components 122 can include, for example, memories, IO devices, LEDs, buttons, switches, connectors, and the like. The circuit board 118 can connect to the computer 101 through the IO interface 106. The computer 101 can load a bitstream into the programmable IC 120 to configure a circuit therein. In some examples, the circuit board 118 can be connected to one or more daughter circuit boards 119. The daughter circuit board(s) 119 include components 124 coupled to the programmable IC 120 through traces and connectors on the daughter board(s) 119 and the circuit board 118. The components 124 can include similar devices as the components 122. In some examples, the circuit board 118 can include multiple programmable ICs mounted thereon and connected to the components 122 and optionally the components 124.

Figure 2:
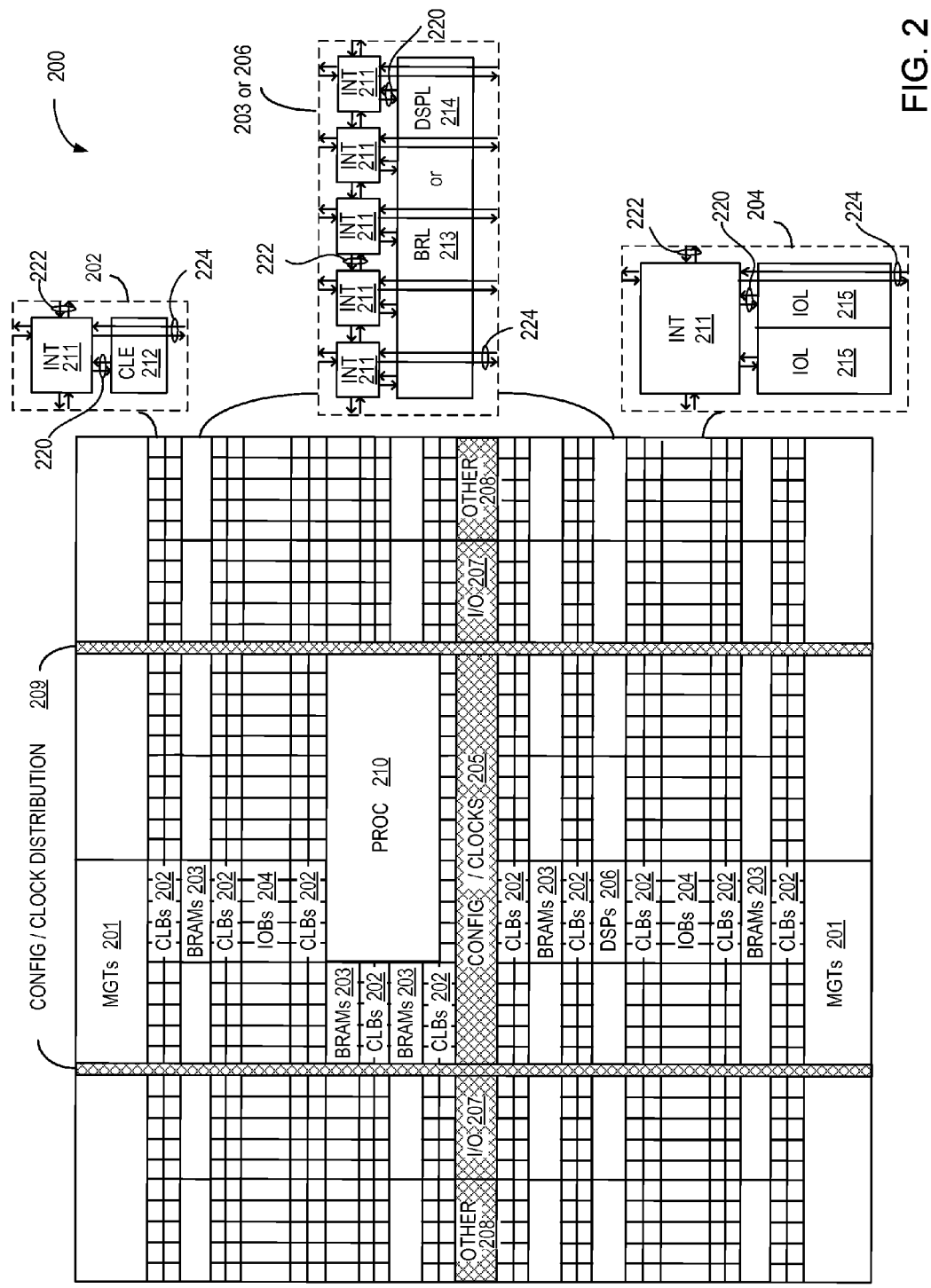
FIG. 2 illustrates an example of a field programmable gate array (FPGA).

FIG. 2 illustrates an example of an FPGA 200. The FPGA 200 can be used as the programmable IC 120 on the circuit board 118. The FPGA 200 includes a programmable fabric that includes a large number of different programmable tiles including multi-gigabit transceivers ("MGTs") 201, configurable logic blocks ("CLBs") 202, random access memory blocks ("BRAMs") 203, input/output blocks ("IOBs") 204, configuration and clocking logic ("CONFIG/CLOCKS") 205, digital signal processing blocks ("DSPs") 206, specialized input/output blocks ("I/O") 207 (e.g., configuration ports and clock ports), and other programmable logic 208 such as digital clock managers, analog-to-digital converters, system monitoring logic, and so forth. Some FPGAs also include dedicated processor blocks ("PROC") 210.

In some FPGAs, each programmable tile can include at least one programmable interconnect element ("INT") 211 having connections to input and output terminals 220 of a programmable logic element within the same tile, as shown by examples included at the top of FIG. 2. Each programmable interconnect element 211 can also include connections to interconnect segments 222 of adjacent programmable interconnect element(s) in the same tile or other tile(s). Each programmable interconnect element 211 can also include connections to interconnect segments 224 of general routing resources between logic blocks (not shown). The general routing resources can include routing channels between logic blocks (not shown) comprising tracks of interconnect segments (e.g., interconnect segments 224) and switch blocks (not shown) for connecting interconnect segments. The interconnect segments of the general routing resources (e.g., interconnect segments 224) can span one or more logic blocks. The programmable interconnect elements 211 taken together with the general routing resources implement a programmable interconnect structure ("programmable interconnect") for the illustrated FPGA. Each programmable interconnect element 211 can include an interconnect circuit that can implement various types of switching among input interconnect segments and output interconnect segments, such as cross-point switching, breakpoint switching, multiplexed switching, and the like.

In an example, a CLB 202 can include a configurable logic element ("CLE") 212 that can be programmed to implement user logic plus a single programmable interconnect element ("INT") 211. A BRAM 203 can include a BRAM logic element ("BRL") 213 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 206 can include a DSP logic element ("DSPL") 214 in addition to an appropriate number of programmable interconnect elements. An IOB 204 can include, for example, two instances of an input/output logic element ("IOL") 215 in addition to one instance of the programmable interconnect element 211. As will be clear to those of skill in the art, the actual I/O pads connected, for example, to the I/O logic element 215 typically are not confined to the area of the input/output logic element 215.

In the pictured example, a horizontal area near the center of the die (shown in FIG. 2) is used for configuration, clock, and other control logic. Vertical columns 209 extending from this horizontal area or column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, processor block 210 spans several columns of CLBs and BRAMs. The processor block 210 can various components ranging from a single microprocessor to a complete programmable processing system of microprocessor(s), memory controllers, peripherals, and the like.

Note that FIG. 2 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 2 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA. Moreover, the FPGA of FIG. 2 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

Figure 3:
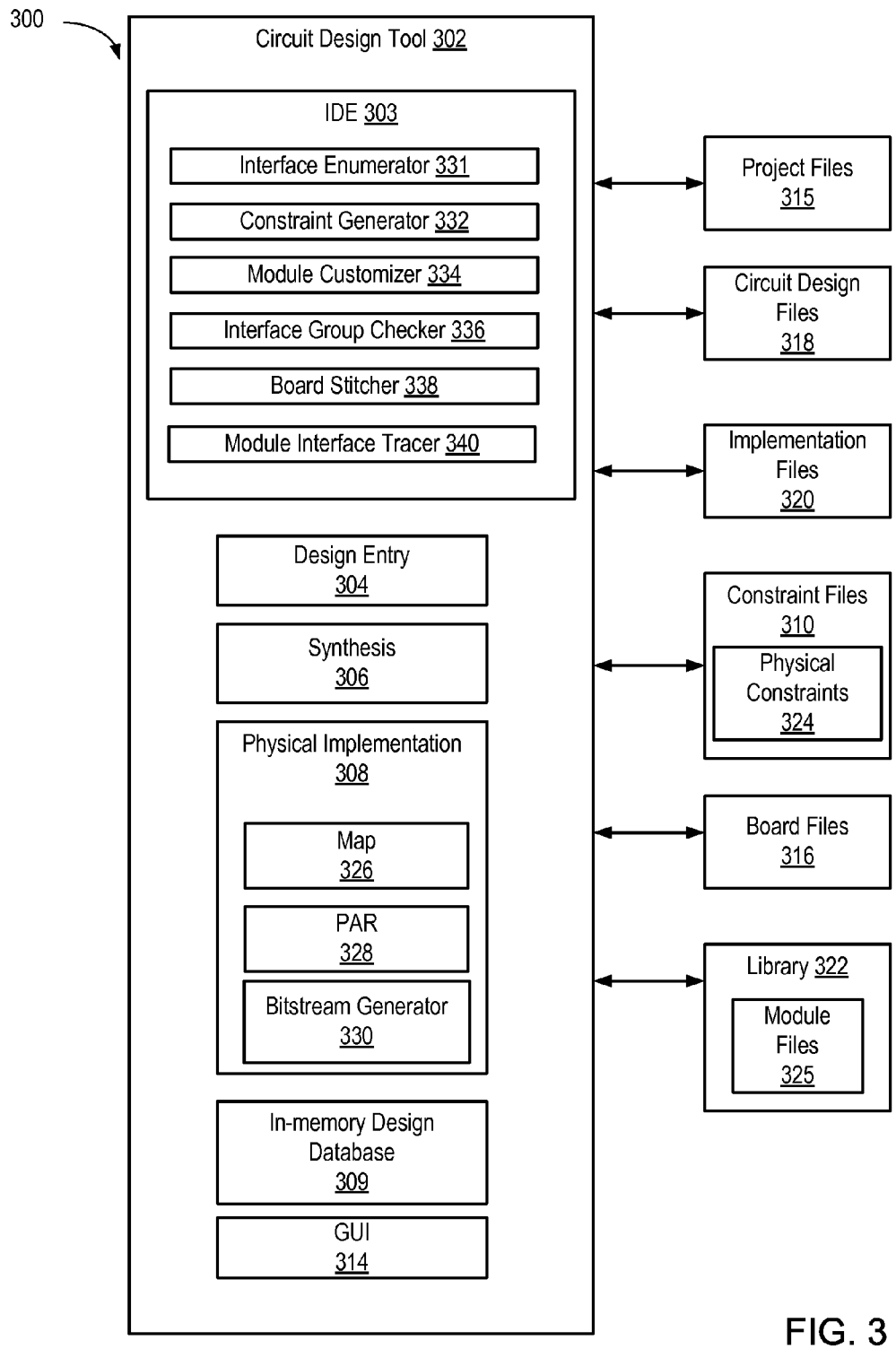
FIG. 3 is a block diagram shown a logical view of the circuit design system of FIG. 1.

FIG. 3 is a block diagram shown a logical view 300 of the circuit design system 100 of FIG. 1. The circuit design system 100 includes a circuit design tool 302 having an integrated development environment (IDE) module 303, a design entry module 304, a synthesis module 306, a physical implementation module 308, and a graphical user interface (GUI) 314. The modules 303, 304, 306, and 308 are just one example implementation of the circuit design tool 302. The functions performed by the modules 303, 304, 306, and 308 described herein can be performed by a different configuration of one or more modules in the circuit design tool 302. The circuit design tool 302 can be implemented by circuitry that is part of an electronic system, by firmware in the electronic system, by software in the electronic system, or by a combination thereof. An example electronic system in which the circuit design system 100 can be implemented is described above in FIG. 1.

In general, the circuit design system 100 generates an abstract description of the circuit design, which is processed into a physical description of the circuit design for a particular target programmable IC. The circuit design system 100 can process the abstract description of the circuit design through various intermediate transformations to produce the physical description of the circuit design for a target programmable IC. The physical description of the circuit design can be formatted and loaded into a programmable IC to produce a physical circuit. Thus, the circuit design system 100 transforms an abstract representation of the circuit design (the abstract description) into a physical representation of the circuit design (the physical description) that can be formatted to realize a physical circuit in a programmable IC.

A user can interact with the circuit design tool 302 to produce project files 315, circuit design files 318, constraint files 310, and implementation files 320. The project files 315 include one or more files specifying project settings for each circuit design. For example, the project files 315 can specify attributes for target hardware of a circuit design, such as a type of programmable IC in the target hardware, a model of the programmable IC, a speed grade of the programmable IC, a number of IO ports of the programmable IC, and the like. The circuit design files 318 include one or more files specifying each circuit design at various levels of abstraction, such as a high-level block model of the circuit design, a lower level hardware description language (HDL) model of the circuit design, or the like. In general, the circuit design files 318 have little or no dependence on the target programmable IC. The constraint files 310 provide design constraints on the circuit design. Design constraints include requirements that must be met in order for the circuit design to be functional. The constraint files 310 include physical constraints 324, which are constraints on the physical implementation of the circuit design. The constraint files 310 can include other types of constraints, such as timing constraints, configuration constraints, and the like. The circuit design tool 302 processes the circuit design files 318 and the constraint files 310 to generate the implementation files 320. The implementation files 320 include one or more files specifying each circuit design with varying dependence of the target programmable IC. For example, the implementation files 320 can include a synthesized netlist, a mapped, placed, and routed netlist, configuration bitstreams, and the like.

In some examples, the circuit design tool 302 can maintain an in-memory design database 309. The in-memory design database 309 includes one or more representations of the circuit design (e.g., functional representations, logical representations, physical representations, etc.) in memory as the design is processed. The state of the circuit design within the in-memory design database 309 can be saved into the circuit design files 318, the implementation files 320, and the constraint files 310 periodically using design checkpoint operations.

The IDE module 303 provides a user interface through the GUI 314 to assemble, implement, and validate a circuit design for a programmable IC. The IDE module 303 controls the overall circuit design process, including invocation of the design entry module 304, the synthesis module 306, and the physical implementation module 308.

The design entry module 304 generates a functional description of the circuit design in response to user input through the GUI 314. The functional description can include descriptions for a plurality of circuit components, such as flip-flops, memories, logic gates, processors, and the like, coupled together by connections (referred to as "nets" or "signals"). The functional description can include a register transfer level (RTL) description specified using a circuit design language (e.g., a hardware description language (HDL)) and/or specified schematically. The functional description can include a high-level model description specified using a program language, such as C, C++, JAVA, or the like, and/or specified schematically. The functional description can include a combination of RTL and high-level model descriptions. The GUI 314 can include a graphic interface through which an end user connects symbols and blocks representing various components to produce a schematic of the circuit design. The GUI 314 can include a text interface through which a user writes HDL/program language code. The GUI 314 can employ a combination of schematic and text-based entry. In some examples, the design entry module 304 can access a library 322 having a plurality of circuit components. The library 322 can include module files 325 that include descriptions of circuit modules referred to as intellectual property (IP) cores. The functional description can be stored in one or more of the circuit design files 318, as well as in the in-memory design database 309.

The synthesis module 306 produces a logical implementation of the circuit design from the functional description. The logical implementation of the circuit design includes a logical representation of the circuit design in terms of specific logic elements. For example, the synthesis module 306 can perform "technology mapping" that transforms generic circuit elements into technology-specific circuit elements. For example, the logical implementation can include a representation of the circuit design in terms of specific logic elements optimized to the architecture of a programmable IC, such as lookup tables (LUTs), carry logic, IO buffers, and like technology-specific components. In another example, the logical implementation can include a representation of the circuit design in terms of logic gates, flip-flops, and the like. The logical implementation can be stored in one or more of the implementation files 320, as well as in the in-memory design database 309.

The physical implementation module 308 produces a physical implementation of the circuit design from the logical implementation. The physical implementation of the circuit design is a physical representation of the circuit design for implementation in a target programmable IC. For example, the physical implementation module 308 can include a map module 326, a place-and-route (PAR) module 328, and a bitstream generator 330. The map module 326 maps the logic elements in the logical implementation onto primitive components within the target programmable IC. The PAR module 328 places the mapped primitive components within the target programmable IC and routes interconnects between the placed primitive components. The bitstream generator 330 generates a configuration bitstream for implementing the circuit design in a target programmable IC. The physical implementation can be stored in one or more of the implementation files 320, as well as in the in-memory design database 309.

The circuit design tool 302 also has access to board files 316. Each of the board files 316 relates to a particular combination of programmable IC(s) and a circuit board having various components. Each of the board files 316 can include descriptions of interfaces to circuit board components ("circuit board interfaces"). Each description of a circuit board interface can include various types of information.

Figure 4:
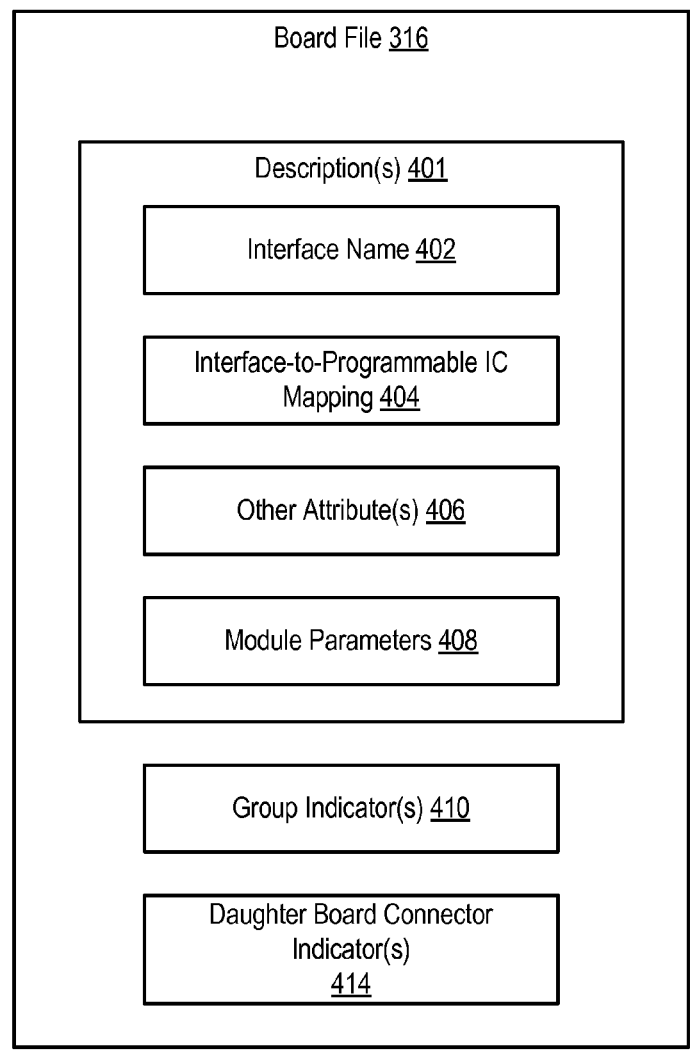
FIG. 4 is a block diagram depicting an example structure of a board file.

FIG. 4 is a block diagram depicting an example structure of a board file 316. The board file 316 includes one or more descriptions 401 of circuit board interfaces. Each of the description(s) 401 includes at least an interface name 402 and an interface-to-programmable IC mapping 404. The interface name 402 uniquely identifies a circuit board interface. The interface-to-programmable IC mapping 404 includes a relation between the circuit board interface and the package pins of the programmable IC(s) on the board. As described herein, the descriptions 401 can be used by the circuit design tool 302 to generate physical constraints for the circuit design.

In various examples, each of the description(s) 401 can include other types of information. For example, a description 401 can include other attribute(s) 406 of the circuit board interface, such as interface type, interface mode, and the like. A description 401 can include module parameters 408 for use in customizing modules of the circuit design (e.g., parameterized IP cores).

The board file 316 can include other types of information related to the circuit board interfaces defined by the descriptions 401. In an example, the board file 316 can include group indicator(s) 410. Each group indicator 410 indicates a particular group of circuit board interfaces. The circuit board interfaces in a given group can be related such that their use is constrained in some way (e.g., all circuit board interfaces in a give group must be connected to the same module in the circuit design). In another example, the board file 316 can include daughter board connection indicator(s) 414. Each of the daughter board connection indicator(s) 414 can indicate a connector for receiving a daughter circuit board, allowing circuit board interfaces of the daughter circuit board to be mapped to package pins of the programmable IC(s) through the connector. As described herein, the circuit design tool 302 can stitch together multiple board files to create a combined board file for a circuit board and daughter board (s).

Returning to FIG. 3, a user can indicate to the circuit design tool 302 that the circuit design is for a target circuit board. The circuit design tool 302 can then access the board files 316 to obtain one or more board files for the circuit board. The IDE module 303 can include one or more modules for processing board file(s), which are described below. Although the board processing modules are described as being part of the IDE module 303, the functions performed by the modules can be performed by other module(s) in the circuit design tool 302. The IDE module 303 includes an interface enumerator 331, a constraint generator 332, a module customizer 334, an interface group checker 336, a board stitcher 338, and a module interface tracer 340.

The interface enumerator 331 cooperates with the GUI 314 to enumerate the circuit board interfaces as described in the board file(s). The interface enumerator 331 can list some or all of the circuit board interfaces using various GUI elements, such as drop-down boxes, text fields, tree views, and the like. A user can select a circuit board interface through the GUI 314 and retrieve information about the circuit board interface, which the interface enumerator 331 obtains from the corresponding description in the board file. In addition, the interface enumerator 331 can allow the user to create an instance of a module in the circuit design that is compatible with a given circuit board interface. The interface enumerator 331 can enumerate module(s) compatible with each circuit board interface using various GUI elements. If the user creates an instance of a compatible module, the interface enumerator 331 can connect the circuit board interface to a circuit design interface created for the compatible module.

The module customizer 334 can set parameters of a given module in the circuit design based on customized parameters in a description of a circuit board interface connected to the given module. For example, a description of a circuit board interface can specify a bus width, a data rate, a clock frequency, or the like for a module connected to the circuit board interface. The module customizer 334 can set the parameters of the connected module from this information. The module customizer 334 can set parameters of an instance of a module created by the interface enumerator 331 as described above. The module customizer 334 can also set parameters of an instance of a module that has already been created in the circuit design.

The constraint generator 332 generates physical constraints for the circuit design based on the connection(s) established between circuit design interface(s) and circuit board interface(s). The physical constraints can include at least a mapping between the circuit design interface(s) and input/outputs of a programmable IC described as being connected to the circuit board interface(s). The mapping can include one or more attributes, such as package pin location, IO standard, and the like.

FIG. 5 shows an example of constraint generation performed by the constraint generator 332. A description 401(1) of a circuit board interface having an "Interface_name" of "dip_switches_4bits" is defined in a board file. The description 401(1) indicates that the "Type" of the circuit board interface is "interface:gpio_rtl:1.0" and that the "Mode" of the circuit board interface is "Master". The "Type" and "Mode" are examples of the other attribute(s) 406. The description 401(1) includes a "PortMapping" that defines which pins of the dip_switches_4bits interface are connected to which package pins of a programmable IC and are using a particular IO standard. In the example, "Pin 0" is connected to package pin "AK25", "Pin 1" is connected to package pin "K15", "Pin 2" is connected to package pin "R27", and "Pin 3" is connected to package pin "T12". All pins of the dip_switches_4bits circuit board interface use the IO standard designated "LVCMOS25".

A circuit design 502 includes a module 504 having a gpio interface 506 connected to a circuit design interface 508 designated "ext_dip_switches_4bits". A user can connect the circuit design interface "ext_dip_switches_4bits" to the circuit board interface "dip_switches_4bits" as described above. In response, the constraint generator 332 generates physical constraints 510. In the present example, the physical constraints 510 are specified in the format "set_property <property> <value> <object list>", although the constraints can be expressed in other ways. The package pins, denoted by the property LOC, are assigned to the specific ports of the circuit design interface ext_dip_switches_4bits based on the description 401(1). That is, "port[0]" of the circuit design interface is assigned to package pin "AK25", which is connected to "Pin 0" of the circuit board interface dip_switches_4bits. Next, "port[1]" of the circuit design interface is assigned to package pin "K15", which is connected to "Pin 1" of the circuit board interface dip_switches_4bits. Next, "port[2]" of the circuit design interface is assigned to package pin "R27", which is connected to "Pin 2" of the circuit board interface dip_switches_4bits. Next, "port[3]" of the circuit design interface is assigned to package pin "T12", which is connected to "Pin 3" of the circuit board interface dip_switches_4bits. All ports of the circuit design interface are configured with the IO standard "LVCMOS25" as specified in the description 401(1).

Returning to FIG. 3, the interface group checker 336 checks connections between circuit design interfaces and circuit board interfaces to verify that no group constraints are violated. As noted above, a board file can specify a group of circuit board interfaces that can be constrained for connection to the same module. The interface group checker 336 can determine if circuit design interfaces connected to a module in the circuit design are connected to circuit board interfaces from different groups and, if so, indicate an error to the user through the GUI 314.

Figure 6:
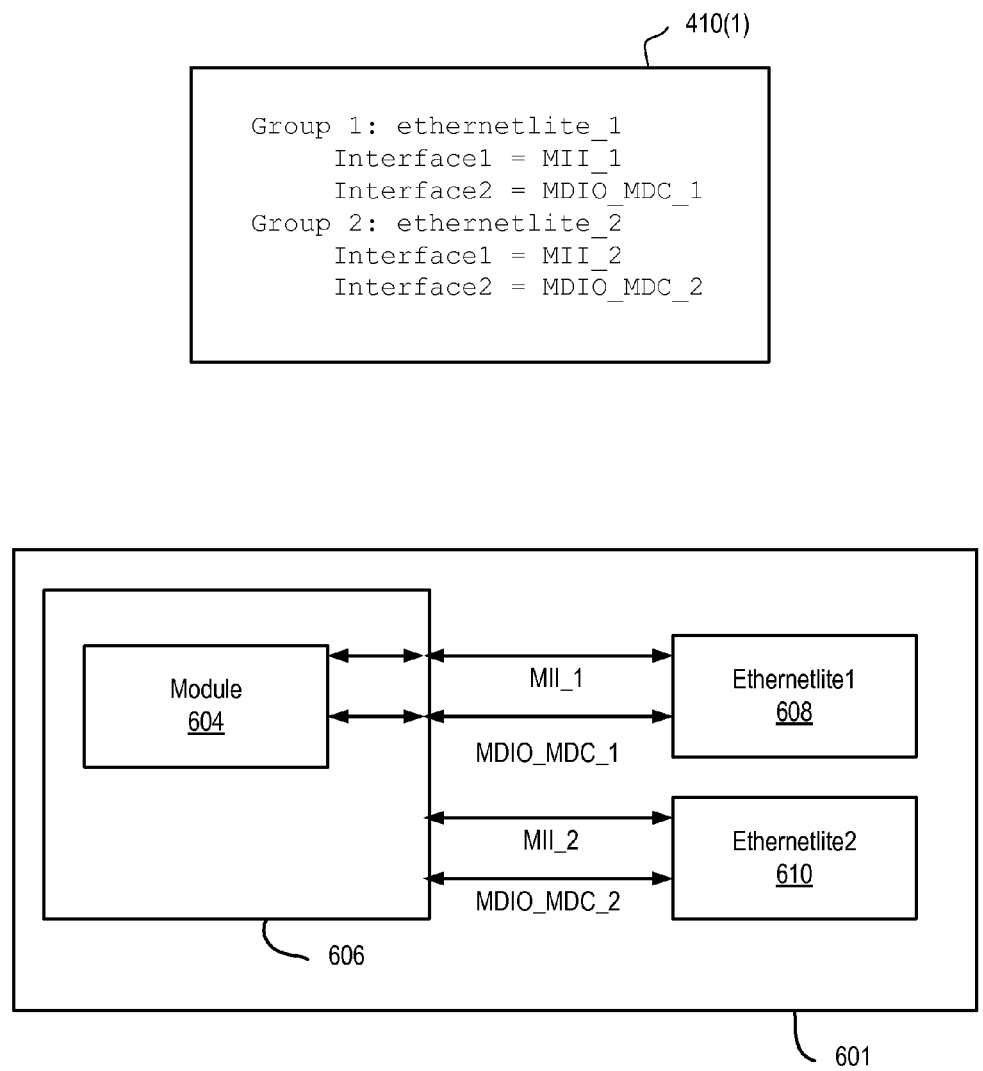
FIG. 6 shows an example of group checking performed by an interface group checker.

FIG. 6 shows an example of group checking performed by the interface group checker 336. A group indicator 410(1) in a board file can specify two groups of circuit board interfaces designated "Group 1" for the circuit board component "ethernetlite_1", and "Group 2" for the circuit board component "ethernetlite_2". Group 1 includes circuit board interfaces "MII_1" and "MDIO_MDC_1" for the ethernetlite_1 component. Group 2 includes circuit board interfaces "MII_2" and "MDIO_MDC_2" for the ethernetlite_2 component. The groups indicate that it is not valid to connect a module to one interface from ethernetlite_1 and another interface from ethernetlite_2. A logical view 601 of the circuit board shows a programmable IC 606 coupled to components 608 and 610 for the ethernetlite1 and ethernetlite2 board components. The programmable IC 606 includes a module 604 of the circuit design configured therein. The circuit design specifies that the module 604 is coupled to the MII_1 and MDIO_MDC_1 circuit board interfaces, which is a valid configuration. If the circuit design specified that the module 604 was instead coupled to the MII_1 circuit board interface and the MDIO_MDC_2 circuit board interface, the interface group checker 336 can indicate an error to the user.

Returning to FIG. 3, the board stitcher 338 can be invoked to combine board files in cases where the user has specified a circuit board and one or more connected daughter boards. The board stitcher 338 can obtain board files for the circuit board and the daughter board(s) and generate a combined board file. As noted above, a circuit board can include connector(s) that can be used to make connections to daughter board(s). The daughter board(s) can obtain additional components and potentially additional programmable IC(s). Each board file can specify daughter board connector indicator(s). The board stitcher 338 can match daughter board connector indicator(s) to merge a plurality of board files.

In some examples, a user can create instance(s) of module(s) in the circuit design external to the interface enumerator 331. The module interface tracer 340 can identify a module interface a given module within the circuit design and expose the module interface as a circuit design interface that can be connected to a circuit board interface. The module interface tracer 340 can trace connections to the module across one or more hierarchical levels of the circuit design. For example, an instance of module can be created at a lower level of the design hierarchy, and the connections to the module traced to the top-level of the design hierarchy, where a circuit design interface can be created. In an example, the interface enumerator 331 can further enumerate circuit design interfaces of the circuit design that have been exposed by the module interface tracer 340. A user can connect a given circuit board interface to a given circuit design interface in the circuit design through the GUI 314.

Figure 7:
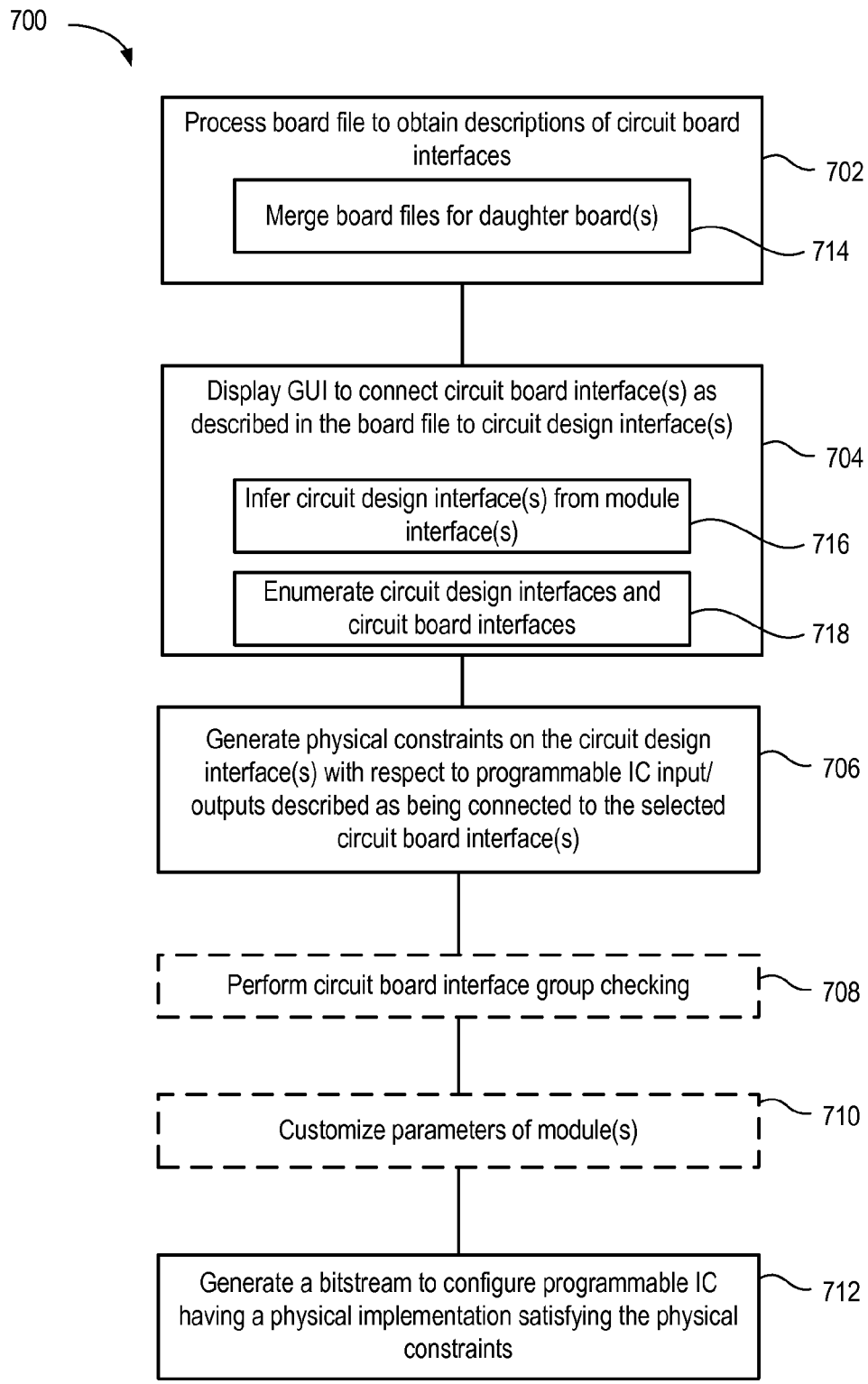
FIG. 7 is a flow diagram depicting an example of a method of implementing a circuit design in a circuit design tool.

FIG. 7 is a flow diagram depicting an example of a method 700 of implementing a circuit design in a circuit design tool. The method 700 begins at block 702, where the circuit design tool processes a board file to obtain descriptions of circuit board interfaces. In an example, block 702 can include a block 714, where the circuit design tool merges multiple board files to create the board file (e.g., a circuit board and daughter board(s)).

At block 704, the circuit design tool displays a GUI to connect circuit board interface(s) as described in the board file to circuit design interface(s). In an example, block 704 includes blocks 716 and 718. At block 716, the circuit design tool infers circuit design interface(s) from module interface(s) of modules in the circuit design. At block 718, the circuit design tool enumerates the circuit board interfaces and the circuit design interfaces for connection.

At block 706, the circuit design tool generates physical constraints on the circuit design interface(s) with respect to programmable IC input/outputs described as being connected to selected circuit board interfaces(s). At optional block 708, the circuit design tool performs circuit board interface group checking to verify that a given module is not connected to circuit board interfaces in different groups. At optional block 710, the circuit design tool customizes parameters of module(s) in the circuit design based on customized parameters in the board file. At block 712, the circuit design tool generates a bitstream to configure a programmable IC having a physical implementation satisfying the physical constraints.

Figure 8:
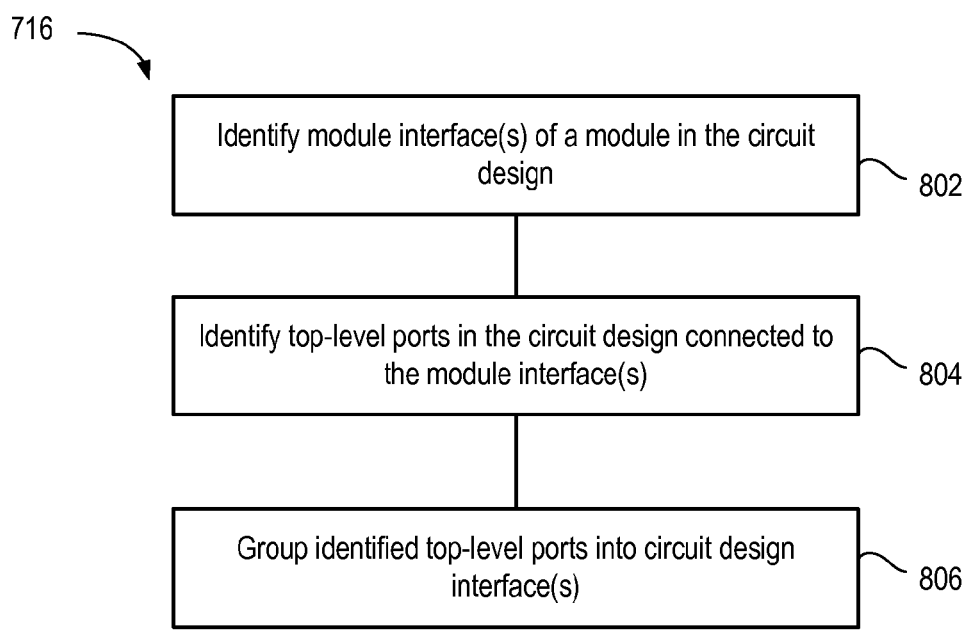
FIG. 8 is a flow diagram depicting an example of a method of inferring circuit design interfaces.

FIG. 8 is a flow diagram depicting an example of a method of inferring circuit design interfaces that can be employed in block 716 of the method 700. Block 716 can begin at block 802, where the circuit design tool identifies module interface(s) of a module in the circuit design. At block 804, the circuit design tool identifies top-level ports of the circuit design connected to the module interfaces. At block 806, the circuit design tool groups the identified top-level ports into circuit design interface(s) that can be connected to circuit board interfaces.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific examples, other and further examples may be devised without departing from the basic scope thereof, and the scope thereof is determined by the claims that follow.

What is claimed is:

1. A method of implementing a circuit design in a circuit design tool for configuration in a programmable integrated circuit (IC) connected to components on a circuit board, the method comprising:
   processing a first file associated with the circuit board to obtain descriptions of circuit board interfaces of the components on the circuit board;
   merging a second file associated with a daughter circuit board connected to the circuit board with the first file associated with the circuit board, the second file including descriptions of circuit board interfaces of components on the daughter circuit board;
   displaying a graphic user interface (GUI) of the circuit design tool to connect a selected circuit board interface described in the first file with a circuit design interface in the circuit design;
   generating physical constraints on the circuit design interface with respect to input/outputs of the programmable IC described as being connected to the selected circuit board interface; and
   generating a bitstream to configure the programmable IC, the bitstream including a physical implementation of the circuit design satisfying the physical constraints.

2. The method of claim 1, wherein the physical constraints comprise input/output (IO) constraints on ports of the circuit design interface, the IO constraints defining at least one of package pin location or IO standard for each of the ports.

3. The method of claim 1, wherein:
   the GUI connects a plurality of circuit design interfaces of the circuit design to a plurality of selected circuit board interfaces described in the first file; and
   the method further comprises:
      processing the first file to identify groups of the circuit board interfaces; and
      checking that the plurality of selected circuit board interfaces is part of the same group of circuit board interfaces.

4. The method of claim 1, further comprising:
   setting parameters of a module in the circuit design connected to the circuit design interface based on a description of the selected circuit board interface in the first file.

5. The method of claim 1, further comprising:
   identifying a module interface of a module in the circuit design;
   identifying top-level ports of the circuit design connected to the module interface; and
   grouping the top-level ports into the circuit design interface.

6. The method of claim 1, wherein the GUI of the circuit design tool enumerates circuit design interfaces of the circuit design and the circuit board interfaces described in the first file.

7. The method of claim 6, wherein the circuit design interfaces enumerated in the GUI of the circuit design tool are inferred from module interfaces of at least one module in the circuit design.

8. A non-transitory computer readable medium comprising instructions, which when executed in a computer system, causes the computer system to carry out a method of implementing a circuit design in a circuit design tool for configuration in a programmable integrated circuit (IC) connected to components on a circuit board, the method comprising:

processing a first file associated with the circuit board to obtain descriptions of circuit board interfaces of the components on the circuit board;

merging a second file associated with a daughter circuit board connected to the circuit board with the first file associated with the circuit board, the second file including descriptions of circuit board interfaces of components on the daughter circuit board;

displaying a graphic user interface (GUI) of the circuit design tool to connect a selected circuit board interface described in the first file with a circuit design interface in the circuit design;

generating physical constraints on the circuit design interface with respect to input/outputs of the programmable IC described as being connected to the selected circuit board interface; and generating a bitstream to configure the programmable IC, the bitstream including a physical implementation of the circuit design satisfying the physical constraints.

9. The non-transitory computer readable medium of claim 8, wherein the physical constraints comprise input/output (IO) constraints on ports of the circuit design interface, the IO constraints defining at least one of package pin location or IO standard for each of the ports.

10. The non-transitory computer readable medium of claim 8, wherein:
the GUI connects a plurality of circuit design interfaces of the circuit design to a plurality of selected circuit board interfaces described in the first file: and
the method further comprises:
processing the first file to identify groups of the circuit board interfaces; and
checking that the plurality of selected circuit board interfaces is part of the same group of circuit board interfaces.

11. The non-transitory computer readable medium of claim 8, further comprising:
setting parameters of a module in the circuit design connected to the circuit design interface based on a description of the selected circuit board interface in the first file.

12. The non-transitory computer readable medium of claim 8, further comprising:
identifying a module interface of a module in the circuit design;
identifying top-level ports of the circuit design connected to the module interface; and
grouping the top-level ports into the circuit design interface.

13. The non-transitory computer readable medium of claim 8, wherein the GUI of the circuit design tool enumerates circuit design interfaces of the circuit design and the circuit board interfaces described in the first file.

14. The non-transitory computer readable medium of claim 13, wherein the circuit design interfaces enumerated in the GUI of the circuit design tool are inferred from module interfaces of at least one module in the circuit design.

15. A circuit design system, comprising:
a memory to store circuit design tool code; and
a central processing unit (CPU) that executes the circuit design tool code to:
process a first file associated with a circuit board to obtain descriptions of circuit board interfaces of components on the circuit board;
merge a second file associated with a daughter circuit board connected to the circuit board with the first file associated with the circuit board, the second file including descriptions of circuit board interfaces of components on the daughter circuit board;
display a graphic user interface (GUI) to connect a selected circuit board interface described in the first file with a circuit design interface in a circuit design;
generate physical constraints on the circuit design interface with respect to input/outputs of a programmable IC described as being connected to the selected circuit board interface; and
generate a bitstream to configure the programmable IC, the bitstream including a physical implementation of the circuit design satisfying the physical constraints.

16. The circuit design system of claim 15, wherein the GUI connects a plurality of circuit design interfaces of the circuit design to a plurality of selected circuit board interfaces described in the first file, and wherein the CPU further executes the circuit design tool code to:
process the first file to identify groups of the circuit board interfaces; and
check that the plurality of selected circuit board interfaces is part of the same group of circuit board interfaces.

17. The circuit design system of claim 15, wherein the CPU further executes the circuit design tool code to:
set parameters of a module in the circuit design connected to the circuit design interface based on a description of the selected circuit board interface in the first file.

\* \* \* \* \*